United States Patent
Dinan et al.

(10) Patent No.: US 8,483,167 B2
(45) Date of Patent: Jul. 9, 2013

(54) APPARATUS AND METHOD OF DYNAMIC DOWNLINK PERMUTATION ASSIGNMENT FOR USE IN A WIRELESS COMMUNICATION SYSTEM

(75) Inventors: Esmail Dinan, Herndon, VA (US);
Jong-Hak Jung, Leesburg, VA (US);
Swati Tiwari, Austin, TX (US);
Hemanth Pawar, Brambleton, VA (US);
Krishna Sitaram, Chantilly, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 0 days.

(21) Appl. No.: 13/553,633

(22) Filed: Jul. 19, 2012

(65) Prior Publication Data
US 2012/0281668 A1    Nov. 8, 2012

Related U.S. Application Data

(62) Division of application No. 12/821,813, filed on Jun. 23, 2010.

(51) Int. Cl.
*H04L 5/0007* (2006.01)
(52) U.S. Cl.
USPC ............... 370/329; 370/252; 455/452.1
(58) Field of Classification Search
CPC .................................................... H04L 5/0007
USPC .......... 370/230, 252, 328; 455/452.1–452.2, 455/446–451
See application file for complete search history.

(56) References Cited

U.S. PATENT DOCUMENTS

| | | | | |
|---|---|---|---|---|
| 7,058,005 B2 * | 6/2006 | Ehrmann-Patin et al. | ..... | 370/208 |
| 7,227,852 B2 * | 6/2007 | Suzuki | ..... | 370/337 |
| 7,729,305 B2 * | 6/2010 | Cho et al. | ..... | 370/328 |
| 7,773,499 B2 * | 8/2010 | Hart et al. | ..... | 370/206 |
| 7,801,230 B2 * | 9/2010 | Sung et al. | ..... | 375/260 |
| 7,894,543 B2 * | 2/2011 | Chang et al. | ..... | 375/267 |
| 7,952,989 B2 * | 5/2011 | Qi et al. | ..... | 370/208 |
| 8,077,664 B2 * | 12/2011 | Zangi | ..... | 370/328 |
| 8,111,609 B2 * | 2/2012 | Wei et al. | ..... | 370/208 |
| 8,121,018 B2 * | 2/2012 | Chen et al. | ..... | 370/203 |
| 8,134,960 B2 * | 3/2012 | Cho et al. | ..... | 370/328 |
| 8,139,666 B2 * | 3/2012 | Hung et al. | ..... | 375/260 |
| 8,270,426 B2 * | 9/2012 | Choi et al. | ..... | 370/437 |
| 2009/0252079 A1 * | 10/2009 | Zhang et al. | ..... | 370/315 |
| 2009/0262696 A1 * | 10/2009 | Wei et al. | ..... | 370/329 |
| 2010/0014476 A1 * | 1/2010 | Eun et al. | ..... | 370/329 |
| 2010/0103895 A1 * | 4/2010 | Cho et al. | ..... | 370/329 |
| 2010/0118800 A1 * | 5/2010 | Kim et al. | ..... | 370/329 |
| 2010/0189040 A1 * | 7/2010 | You et al. | ..... | 370/328 |
| 2010/0226333 A1 * | 9/2010 | Cho et al. | ..... | 370/329 |
| 2011/0026392 A1 * | 2/2011 | Wen et al. | ..... | 370/203 |
| 2011/0261805 A1 * | 10/2011 | Landry et al. | ..... | 370/342 |

* cited by examiner

*Primary Examiner* — Ricky Ngo
*Assistant Examiner* — Ben H Liu
(74) *Attorney, Agent, or Firm* — David Wright Tremaine LLP; Michael J. Donohue; Heather M. Colburn

(57) ABSTRACT

A method of assigning parameter values to transceivers in a wireless communication network. Each of the parameter values assigned determines at least in part how a plurality of subcarriers are organized into a plurality of sub-channels. In particular embodiments, the method assigns the parameter values to the transceivers based on correlations between the sub-channels determined by the parameter values, distances between the transceivers, and loads experienced by the transceivers. After the parameter values are assigned to the transceivers, each of the transceivers is configured to transmit on the sub-channels determined at least in part by the parameter value assigned to the transceiver.

14 Claims, 10 Drawing Sheets

|  | DL_PERMBASE INDICES | | | | | | | |
|---|---|---|---|---|---|---|---|---|
|  |  | 0 | 1 | 2 | 3 | 4 | 5 | 6 | 7 |
| DL_PERMBASE INDICES | 0 | 1 | 0.05515 | 0.05941 | 0.05917 | 0.06757 | 0.06593 | 0.06757 | 0.05545 |
| | 1 | 0.05515 | 1 | 0.05425 | 0.05952 | 0.05747 | 0.06818 | 0.06329 | 0.06944 |
| | 2 | 0.05941 | 0.05425 | 1 | 0.05435 | 0.05941 | 0.05780 | 0.07059 | 0.06263 |
| | 3 | 0.05917 | 0.05952 | 0.05435 | 1 | 0.05576 | 0.06135 | 0.05894 | 0.06944 |
| | 4 | 0.06757 | 0.05747 | 0.05941 | 0.05576 | 1 | 0.05629 | 0.05976 | 0.05859 |
| | 5 | 0.06593 | 0.06818 | 0.05780 | 0.06135 | 0.05629 | 1 | 0.05566 | 0.06160 |
| | 6 | 0.06757 | 0.06329 | 0.07059 | 0.05894 | 0.05976 | 0.05566 | 1 | 0.05474 |
| | 7 | 0.05545 | 0.06944 | 0.06263 | 0.06944 | 0.05859 | 0.06160 | 0.05474 | 1 |
| | 8 | 0.06579 | 0.05435 | 0.07075 | 0.06383 | 0.06818 | 0.05837 | 0.06110 | 0.05396 |
| | 9 | 0.05618 | 0.06637 | 0.05484 | 0.07009 | 0.06438 | 0.06849 | 0.05906 | 0.06110 |
| | 10 | 0.05917 | 0.05484 | 0.06881 | 0.05650 | 0.06757 | 0.06342 | 0.06881 | 0.05803 |
| | 11 | 0.05535 | 0.05803 | 0.05515 | 0.06726 | 0.05714 | 0.06818 | 0.06424 | 0.06881 |
| | 12 | 0.09259 | 0.05376 | 0.05929 | 0.05587 | 0.06466 | 0.05587 | 0.06818 | 0.06424 |
| | 13 | 0.08746 | 0.09709 | 0.05310 | 0.05814 | 0.05525 | 0.06536 | 0.05545 | 0.06977 |
| | 14 | 0.06048 | 0.08798 | 0.09934 | 0.05435 | 0.05859 | 0.05515 | 0.06757 | 0.05464 |
| | 15 | 0.05859 | 0.06098 | 0.08798 | 0.09464 | 0.05464 | 0.06061 | 0.05607 | 0.06508 |
| | 16 | 0.06608 | 0.05714 | 0.06198 | 0.08824 | 0.09259 | 0.05435 | 0.05906 | 0.05505 |
| | 17 | 0.09174 | 0.06803 | 0.05725 | 0.06186 | 0.08850 | 0.09119 | 0.05474 | 0.06012 |
| | 18 | 0.10000 | 0.09009 | 0.07009 | 0.05894 | 0.06024 | 0.08824 | 0.09404 | 0.05405 |
| | 19 | 0.05425 | 0.10135 | 0.08955 | 0.06682 | 0.05769 | 0.06160 | 0.08824 | 0.09494 |
| | 20 | 0.05941 | 0.05376 | 0.10169 | 0.09063 | 0.06579 | 0.05747 | 0.06211 | 0.08798 |
| | 21 | 0.05576 | 0.06135 | 0.05495 | 0.09804 | 0.09231 | 0.06696 | 0.05871 | 0.06160 |
| | 22 | 0.05929 | 0.05484 | 0.06329 | 0.05545 | 0.09967 | 0.09063 | 0.06834 | 0.05758 |
| | 23 | 0.05386 | 0.05792 | 0.05445 | 0.06186 | 0.05484 | 0.09836 | 0.09259 | 0.06818 |
| | 24 | 0.07979 | 0.05245 | 0.05837 | 0.05545 | 0.05929 | 0.05505 | 0.09677 | 0.09146 |
| | 25 | 0.06849 | 0.08403 | 0.05172 | 0.06000 | 0.05484 | 0.06048 | 0.05386 | 0.10135 |
| | 26 | 0.06623 | 0.06726 | 0.08876 | 0.05282 | 0.05952 | 0.05455 | 0.06329 | 0.05310 |
| | 27 | 0.06173 | 0.06757 | 0.06897 | 0.08403 | 0.05367 | 0.06110 | 0.05545 | 0.06012 |
| | 28 | 0.05848 | 0.06098 | 0.06726 | 0.06961 | 0.07979 | 0.05357 | 0.05848 | 0.05445 |
| | 29 | 0.05825 | 0.05988 | 0.06085 | 0.06834 | 0.06912 | 0.07958 | 0.05338 | 0.06036 |
| | 30 | 0.15152 | 0.05714 | 0.06276 | 0.06098 | 0.06667 | 0.06944 | 0.08357 | 0.05254 |
| | 31 | 0.05736 | 0.15306 | 0.05269 | 0.05894 | 0.06036 | 0.06757 | 0.06818 | 0.07979 |

FIGURE 3

| | | DL_PERMBASE INDICES | | | | | | | |
|---|---|---|---|---|---|---|---|---|---|
| | | 8 | 9 | 10 | 11 | 12 | 13 | 14 | 15 |
| DL_PERMBASE INDICES | 0 | 0.06579 | 0.05618 | 0.05917 | 0.05535 | 0.09259 | 0.08746 | 0.06048 | 0.05859 |
| | 1 | 0.05435 | 0.06637 | 0.05484 | 0.05803 | 0.05376 | 0.09709 | 0.08798 | 0.06098 |
| | 2 | 0.07075 | 0.05484 | 0.06881 | 0.05515 | 0.05929 | 0.05310 | 0.09934 | 0.08798 |
| | 3 | 0.06383 | 0.07009 | 0.05650 | 0.06726 | 0.05587 | 0.05814 | 0.05435 | 0.09464 |
| | 4 | 0.06818 | 0.06438 | 0.06757 | 0.05714 | 0.06466 | 0.05525 | 0.05859 | 0.05464 |
| | 5 | 0.05837 | 0.06849 | 0.06342 | 0.06818 | 0.05587 | 0.06536 | 0.05515 | 0.06061 |
| | 6 | 0.06110 | 0.05906 | 0.06881 | 0.06424 | 0.06818 | 0.05545 | 0.06757 | 0.05607 |
| | 7 | 0.05396 | 0.06110 | 0.05803 | 0.06881 | 0.06424 | 0.06977 | 0.05464 | 0.06508 |
| | 8 | 1 | 0.05445 | 0.06148 | 0.05792 | 0.06818 | 0.06316 | 0.07177 | 0.05495 |
| | 9 | 0.05445 | 1 | 0.05556 | 0.06036 | 0.05848 | 0.07075 | 0.06397 | 0.07009 |
| | 10 | 0.06148 | 0.05556 | 1 | 0.05545 | 0.06000 | 0.05792 | 0.07109 | 0.06410 |
| | 11 | 0.05792 | 0.06036 | 0.05545 | 1 | 0.05576 | 0.05871 | 0.05837 | 0.07059 |
| | 12 | 0.06818 | 0.05848 | 0.06000 | 0.05576 | 1 | 0.05515 | 0.05941 | 0.05917 |
| | 13 | 0.06316 | 0.07075 | 0.05792 | 0.05871 | 0.05515 | 1 | 0.05425 | 0.05952 |
| | 14 | 0.07177 | 0.06397 | 0.07109 | 0.05837 | 0.05941 | 0.05425 | 1 | 0.05435 |
| | 15 | 0.05495 | 0.07009 | 0.06410 | 0.07059 | 0.05917 | 0.05952 | 0.05435 | 1 |
| | 16 | 0.06438 | 0.05607 | 0.06803 | 0.06536 | 0.06757 | 0.05747 | 0.05941 | 0.05576 |
| | 17 | 0.05515 | 0.06623 | 0.05629 | 0.06803 | 0.06593 | 0.06818 | 0.05780 | 0.06135 |
| | 18 | 0.06000 | 0.05566 | 0.06667 | 0.05639 | 0.06757 | 0.06329 | 0.07059 | 0.05894 |
| | 19 | 0.05338 | 0.05941 | 0.05495 | 0.06608 | 0.05545 | 0.06944 | 0.06263 | 0.06944 |
| | 20 | 0.09434 | 0.05445 | 0.05964 | 0.05545 | 0.06579 | 0.05435 | 0.07075 | 0.06383 |
| | 21 | 0.08850 | 0.09464 | 0.05464 | 0.05941 | 0.05618 | 0.06637 | 0.05484 | 0.07009 |
| | 22 | 0.06122 | 0.08798 | 0.09404 | 0.05515 | 0.05917 | 0.05484 | 0.06881 | 0.05650 |
| | 23 | 0.05758 | 0.06122 | 0.08902 | 0.09404 | 0.05535 | 0.05803 | 0.05515 | 0.06726 |
| | 24 | 0.06696 | 0.05859 | 0.06237 | 0.08955 | 0.09259 | 0.05376 | 0.05929 | 0.05587 |
| | 25 | 0.09091 | 0.06772 | 0.05769 | 0.06000 | 0.08746 | 0.09709 | 0.05310 | 0.05814 |
| | 26 | 0.10309 | 0.09091 | 0.06928 | 0.05760 | 0.06048 | 0.08798 | 0.09934 | 0.05435 |
| | 27 | 0.05505 | 0.09804 | 0.09231 | 0.06803 | 0.05859 | 0.06098 | 0.08798 | 0.09464 |
| | 28 | 0.05906 | 0.05587 | 0.09709 | 0.09202 | 0.06608 | 0.05714 | 0.06198 | 0.08824 |
| | 29 | 0.05445 | 0.06061 | 0.05545 | 0.09772 | 0.09174 | 0.06803 | 0.05725 | 0.06186 |
| | 30 | 0.06061 | 0.05566 | 0.06263 | 0.05545 | 0.10000 | 0.09009 | 0.07009 | 0.05894 |
| | 31 | 0.05208 | 0.06098 | 0.05455 | 0.06061 | 0.05425 | 0.10135 | 0.08955 | 0.06682 |

FIGURE 4

|  | DL_PERMBASE INDICES | | | | | | | |
|---|---|---|---|---|---|---|---|---|
|  | 16 | 17 | 18 | 19 | 20 | 21 | 22 | 23 |
| 0 | 0.06608 | 0.09174 | 0.10000 | 0.05425 | 0.05941 | 0.05576 | 0.05929 | 0.05386 |
| 1 | 0.05714 | 0.06803 | 0.09009 | 0.10135 | 0.05376 | 0.06135 | 0.05484 | 0.05792 |
| 2 | 0.06198 | 0.05725 | 0.07009 | 0.08955 | 0.10169 | 0.05495 | 0.06329 | 0.05445 |
| 3 | 0.08824 | 0.06186 | 0.05894 | 0.06682 | 0.09063 | 0.09804 | 0.05545 | 0.06186 |
| 4 | 0.09259 | 0.08850 | 0.06024 | 0.05769 | 0.06579 | 0.09231 | 0.09967 | 0.05464 |
| 5 | 0.05435 | 0.09119 | 0.08824 | 0.06160 | 0.05747 | 0.06696 | 0.09063 | 0.09836 |
| 6 | 0.05906 | 0.05474 | 0.09404 | 0.05824 | 0.06211 | 0.05871 | 0.06834 | 0.09259 |
| 7 | 0.05505 | 0.06012 | 0.05405 | 0.09494 | 0.08798 | 0.06160 | 0.05758 | 0.06818 |
| 8 | 0.06438 | 0.05515 | 0.06000 | 0.05338 | 0.09434 | 0.08850 | 0.06122 | 0.05758 |
| 9 | 0.05607 | 0.06623 | 0.05566 | 0.05941 | 0.05445 | 0.09464 | 0.08798 | 0.06122 |
| 10 | 0.06803 | 0.05629 | 0.06667 | 0.05495 | 0.05964 | 0.05464 | 0.09404 | 0.08902 |
| 11 | 0.06536 | 0.06803 | 0.05639 | 0.06608 | 0.05545 | 0.05941 | 0.05515 | 0.09404 |
| 12 | 0.06757 | 0.06593 | 0.06757 | 0.05545 | 0.06579 | 0.05618 | 0.05917 | 0.05535 |
| 13 | 0.05747 | 0.06818 | 0.06329 | 0.06944 | 0.05435 | 0.06637 | 0.05484 | 0.05803 |
| 14 | 0.05941 | 0.05780 | 0.07059 | 0.06263 | 0.07075 | 0.05484 | 0.06881 | 0.05515 |
| 15 | 0.05576 | 0.06135 | 0.05894 | 0.06944 | 0.06383 | 0.07009 | 0.05650 | 0.06726 |
| 16 | 1 | 0.05629 | 0.05976 | 0.05859 | 0.06818 | 0.06438 | 0.06757 | 0.05714 |
| 17 | 0.05629 | 1 | 0.05566 | 0.06160 | 0.05837 | 0.06849 | 0.06342 | 0.06818 |
| 18 | 0.05976 | 0.05566 | 1 | 0.05474 | 0.06110 | 0.05906 | 0.06881 | 0.06424 |
| 19 | 0.05859 | 0.06160 | 0.05474 | 1 | 0.05396 | 0.06110 | 0.05803 | 0.06881 |
| 20 | 0.06818 | 0.05837 | 0.06110 | 0.05396 | 1 | 0.05445 | 0.06148 | 0.05792 |
| 21 | 0.06438 | 0.06849 | 0.05906 | 0.06110 | 0.05445 | 1 | 0.05556 | 0.06036 |
| 22 | 0.06757 | 0.06342 | 0.06881 | 0.05803 | 0.06148 | 0.05556 | 1 | 0.05545 |
| 23 | 0.05714 | 0.06818 | 0.06424 | 0.06881 | 0.05792 | 0.06036 | 0.05545 | 1 |
| 24 | 0.06466 | 0.05587 | 0.06818 | 0.06424 | 0.06818 | 0.05848 | 0.06000 | 0.05576 |
| 25 | 0.05525 | 0.06536 | 0.05545 | 0.06977 | 0.06316 | 0.07075 | 0.05792 | 0.05871 |
| 26 | 0.05859 | 0.05515 | 0.06757 | 0.05464 | 0.07177 | 0.06397 | 0.07109 | 0.05837 |
| 27 | 0.05464 | 0.06061 | 0.05607 | 0.06508 | 0.05495 | 0.07009 | 0.06410 | 0.07059 |
| 28 | 0.09259 | 0.05435 | 0.05906 | 0.05505 | 0.06438 | 0.05607 | 0.06803 | 0.06536 |
| 29 | 0.08850 | 0.09119 | 0.05474 | 0.06012 | 0.05515 | 0.06623 | 0.05629 | 0.06803 |
| 30 | 0.06024 | 0.08824 | 0.09404 | 0.05405 | 0.06000 | 0.05566 | 0.06667 | 0.05639 |
| 31 | 0.05769 | 0.06160 | 0.08824 | 0.09494 | 0.05338 | 0.05941 | 0.05495 | 0.06608 |

FIGURE 5

| | DL_PERMBASE INDICES | | | | | | | |
|---|---|---|---|---|---|---|---|---|
| | 24 | 25 | 26 | 27 | 28 | 29 | 30 | 31 |
| 0 | 0.07979 | 0.06849 | 0.06623 | 0.06173 | 0.05848 | 0.05825 | 0.15152 | 0.05736 |
| 1 | 0.05245 | 0.08403 | 0.06726 | 0.06757 | 0.06098 | 0.05988 | 0.05714 | 0.15306 |
| 2 | 0.05837 | 0.05172 | 0.08876 | 0.06897 | 0.06726 | 0.06085 | 0.06276 | 0.05269 |
| 3 | 0.05545 | 0.06000 | 0.05282 | 0.08403 | 0.06961 | 0.06834 | 0.06098 | 0.05894 |
| 4 | 0.05929 | 0.05484 | 0.05952 | 0.05367 | 0.07979 | 0.06912 | 0.06667 | 0.06036 |
| 5 | 0.05505 | 0.06048 | 0.05455 | 0.06110 | 0.05357 | 0.07958 | 0.06944 | 0.06757 |
| 6 | 0.09677 | 0.05386 | 0.06329 | 0.05545 | 0.05848 | 0.05338 | 0.08357 | 0.06818 |
| 7 | 0.09146 | 0.10135 | 0.05310 | 0.06012 | 0.05445 | 0.06036 | 0.05254 | 0.07979 |
| 8 | 0.06696 | 0.09091 | 0.10309 | 0.05505 | 0.05906 | 0.05445 | 0.06061 | 0.05208 |
| 9 | 0.05859 | 0.06772 | 0.09091 | 0.09804 | 0.05587 | 0.06061 | 0.05566 | 0.06098 |
| 10 | 0.06237 | 0.05769 | 0.06928 | 0.09231 | 0.09709 | 0.05545 | 0.06263 | 0.05455 |
| 11 | 0.08955 | 0.06000 | 0.05780 | 0.06803 | 0.09202 | 0.09772 | 0.05545 | 0.06061 |
| 12 | 0.09259 | 0.08746 | 0.06048 | 0.05859 | 0.06608 | 0.09174 | 0.10000 | 0.05425 |
| 13 | 0.05376 | 0.09709 | 0.08798 | 0.06098 | 0.05714 | 0.06803 | 0.09009 | 0.10135 |
| 14 | 0.05929 | 0.05310 | 0.09934 | 0.08798 | 0.06198 | 0.05725 | 0.07009 | 0.08955 |
| 15 | 0.05587 | 0.05814 | 0.05435 | 0.09464 | 0.08824 | 0.06186 | 0.05894 | 0.06682 |
| 16 | 0.06466 | 0.05525 | 0.05859 | 0.05464 | 0.09259 | 0.08850 | 0.06024 | 0.05769 |
| 17 | 0.05587 | 0.06536 | 0.05515 | 0.06061 | 0.05435 | 0.09119 | 0.08824 | 0.06160 |
| 18 | 0.06818 | 0.05545 | 0.06757 | 0.05607 | 0.05906 | 0.05474 | 0.09404 | 0.06824 |
| 19 | 0.06424 | 0.06977 | 0.05464 | 0.06508 | 0.05505 | 0.06012 | 0.05405 | 0.09494 |
| 20 | 0.06818 | 0.06316 | 0.07177 | 0.05495 | 0.06438 | 0.05515 | 0.06000 | 0.05338 |
| 21 | 0.05848 | 0.07075 | 0.06397 | 0.07009 | 0.05607 | 0.06623 | 0.05566 | 0.05941 |
| 22 | 0.06000 | 0.05792 | 0.07109 | 0.06410 | 0.06803 | 0.05629 | 0.06667 | 0.05495 |
| 23 | 0.05576 | 0.05871 | 0.05837 | 0.07059 | 0.06536 | 0.06803 | 0.05639 | 0.06608 |
| 24 | 1 | 0.05515 | 0.05941 | 0.05917 | 0.06757 | 0.06593 | 0.06757 | 0.05545 |
| 25 | 0.05515 | 1 | 0.05425 | 0.05952 | 0.05747 | 0.06818 | 0.06329 | 0.06944 |
| 26 | 0.05941 | 0.05425 | 1 | 0.05435 | 0.05941 | 0.05780 | 0.07059 | 0.06263 |
| 27 | 0.05917 | 0.05952 | 0.05435 | 1 | 0.05576 | 0.06135 | 0.05894 | 0.06944 |
| 28 | 0.06757 | 0.05747 | 0.05941 | 0.05576 | 1 | 0.05629 | 0.05976 | 0.05859 |
| 29 | 0.06593 | 0.06818 | 0.05780 | 0.06135 | 0.05629 | 1 | 0.05566 | 0.06160 |
| 30 | 0.06757 | 0.06329 | 0.07059 | 0.05894 | 0.05976 | 0.05566 | 1 | 0.05474 |
| 31 | 0.05545 | 0.06944 | 0.06263 | 0.06944 | 0.05859 | 0.06160 | 0.05474 | 1 |

(Row labels: DL_PERMBASE INDICES)

FIGURE 6

APPARATUS AND METHOD OF DYNAMIC DOWNLINK PERMUTATION ASSIGNMENT FOR USE IN A WIRELESS COMMUNICATION SYSTEM

CROSS REFERENCE TO RELATED APPLICATION(S)

This application is a divisional of U.S. patent application Ser. No. 12/821,813, filed Jun. 23, 2010, which is incorporated herein by reference in its entirety.

BACKGROUND OF THE INVENTION

1. Field of the Invention

The present invention is directed generally configuration of a cellular wireless network, and more particularly, to an apparatus and method of assigning configuration parameters to transceivers in a cellular wireless network.

2. Description of the Related Art

A wireless network includes a plurality of base stations ("BS") each having one or more transceivers configured to transmit and receive signals over at least one wireless communication link. The area covered by a BS is typically divided into sectors, each sector having one or more transceiver. A mobile station ("MS") transmits data to a BS on an uplink ("UL") portion of the communication link and receives data from the BS on a downlink ("DL") portion of the same communication link.

Worldwide Interoperability for Microwave Access ("WiMAX") broadband services are provided over channels, which are typically 5 MHz, 10 MHz, or 20 MHz. A different channel is typically assigned to each sector of a BS. If multiple transceivers are operating within a sector, each transceiver may be assigned a different channel. However, within the wireless network, channels are typically reused in well known reuse schemes (such as a conventional WiMAX 1/3/3 reuse scheme and the like).

At the physical layer of the Open Systems Interconnection Reference Model (or OSI Model), WiMAX uses orthogonal frequency-division multiplexing ("OFDM") to divide a channel into a large number of closely-spaced orthogonal subcarriers. To provide multiple access, WiMAX uses Orthogonal Frequency-Division Multiple Access ("OFDMA") to assign subsets of subcarriers to sub-channels. Each sub-channel is then assigned to an individual user.

Sub-channelization refers to the division of available subcarriers into sub-channels. Sub-channels may include contiguous subcarriers or subcarriers pseudo-randomly distributed across the frequency spectrum. WiMAX defines several sub-channelization schemes based on distributed carriers for both the UL and the DL. For example, partial usage of subcarriers ("PUSC") and full usage of the subcarriers ("FUSC") are sub-channelization schemes using subcarriers distributed across the frequency spectrum.

A WiMAX MS transmits UL and DL data signals over the sub-channel assigned to a user in frames. Each frame includes an UL portion and a DL portion. The frame may also include a DL map ("DL_MAP") portion that includes information about how the DL portion is structured. The MS may use the DL_MAP to decode the DL portion of the frame.

The total communication capacity of the frame may be viewed as a time/frequency grid or symbol/sub-channel grid. The time/frequency grid of the frame may be divided into permutation zones, which are groupings of contiguous symbols that use the same sub-channelization scheme. Thus, the frame may include a DL PUSC permutation zone, a DL FUSC permutation zone, and the like. Each of the permutation zones is divided into slots, a slot being the basic unit of allocation in the symbol/sub-channel grid.

In implementations in which broadband services are provided over a 10 MHz channel and a 1024-FFT OFDMA symbol is used, there are typically 840 pilot and data subcarriers assigned to the DL PUSC zone. According to applicable WiMAX standards (e.g., WiMAX air-interface standard Institute of Electrical and Electronics Engineers ("IEEE") 802.16e-2005), the first step in sub-channelizing the DL PUSC zone is to divide the 840 subcarriers into 60 clusters each having 14 adjacent subcarriers (60*14=840).

Next, these clusters are renumbered or assigned logical numbers ("LN") using a first predefined formula. The first predefined formula includes a Downlink Permutation ("DL_PermBase") index value. The DL_PermBase index value is an integer within the range of 0 to 31. The DL_PermBase index value is assigned to the transceiver that transmits the DL portion of the frame and may be transmitted thereby to the MS in the DL_MAP portion of WiMAX frames.

Then, the clusters are each assigned to one of six groups based on their LN. Lastly, the subcarriers are assigned to sub-channels. In this example, the frame includes 30 sub-channels. Each sub-channel includes 24 subcarriers to be used as data carriers and 4 subcarriers to be used as pilot carriers. Thus, the frame includes 840 (30*(24+4)=840) data carriers. In each sub-channel, the subcarriers belong to the same group. A second predefined formula, including the DL_PermBase index value, is used to assign the subcarriers to the sub-channels.

The DL FUSC zone is sub-channelized by dividing the subcarriers into groups of contiguous subcarriers. If the channel is 10 MHz, the subcarriers are divided into 48 groups, numbered 0 to 47. Then, each sub-channel is constructed by assigning a subcarrier from each group to the sub-channel. Thus, 16 sub-channels each having 48 subcarriers are created for a 10 MHz channel.

Partial usage of sub-channels ("PUSC") and full usage of sub-channels ("FUSC") may be characterized as distributed permutations in which the subcarriers are assigned to the sub-channels pseudo-randomly. The main advantages of such distributed permutations are frequency diversity and inter-cell interference averaging. Diversity permutations minimize the probability of using the same subcarrier in nearby sectors or cells. On the other hand, channel estimation may be difficult because the subcarriers are distributed over the available bandwidth of the channel.

As explained above, the DL_PermBase index value dictates at least in part the assignment of subcarriers to sub-channels in the DL PUSC zone. This process may help reduce interference in the DL. For example, if two nearby BS sectors are assigned the same channel and different DL_PermBase indices, the interference level between the nearby sectors will be lower than if the nearby sectors were assigned the same channel and the same DL_PermBase index value. In the later case, the interference between the nearby sectors would be 100%.

Currently, DL_PermBase index values are assigned manually to each transceiver in the wireless network by a technician. The assignment is fixed per the technician's initial assignment and does not change during operation of the wireless network. Therefore, a need exists for a technique to assign DL_PermBase index values to transceivers in a wireless network that considers actual operating conditions of the wireless network. A technique that considers actual interference between nearby transceivers would be particularly beneficial. The present application provides these and other advantages as will be apparent from the following detailed description and accompanying figures.

BRIEF DESCRIPTION OF THE SEVERAL VIEWS OF THE DRAWING(S)

FIG. 3 is a correlation matrix including correlation values between DL_PermBase index values 1 to 31 and DL_Perm-Base index values 1 to 7.

FIG. 4 is a correlation matrix including correlation values between DL_PermBase index values 1 to 31 and DL_Perm-Base index values 8 to 15.

FIG. 5 is a correlation matrix including correlation values between DL_PermBase index values 1 to 31 and DL_Perm-Base index values 16 to 23.

FIG. 6 is a correlation matrix including correlation values between DL_PermBase index values 1 to 31 and DL_Perm-Base index values 24 to 31.

Figure 7:
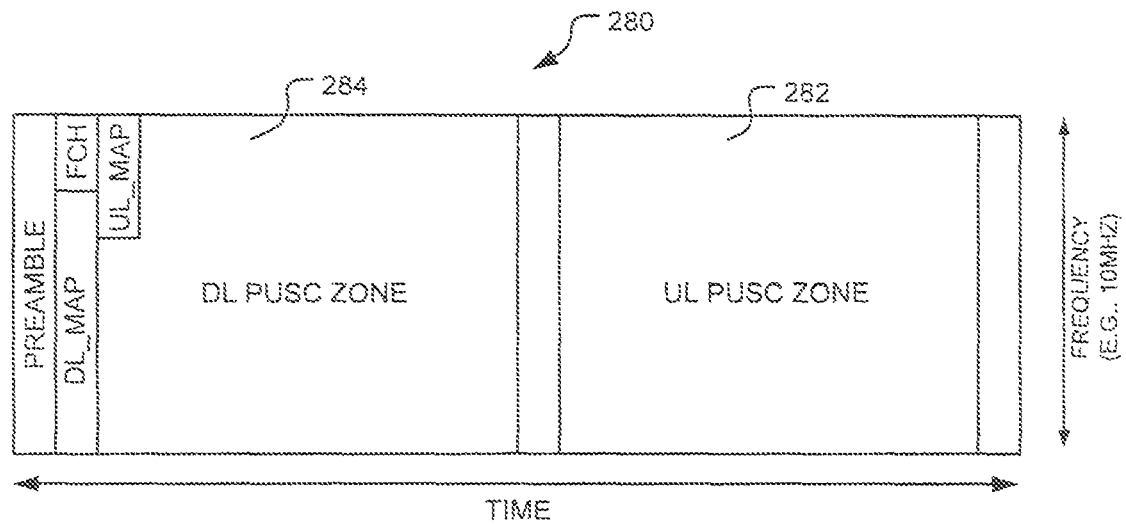

FIG. 7 an illustration of an exemplary frame having an uplink permutation zone and a downlink permutation zone.

Figure 2:
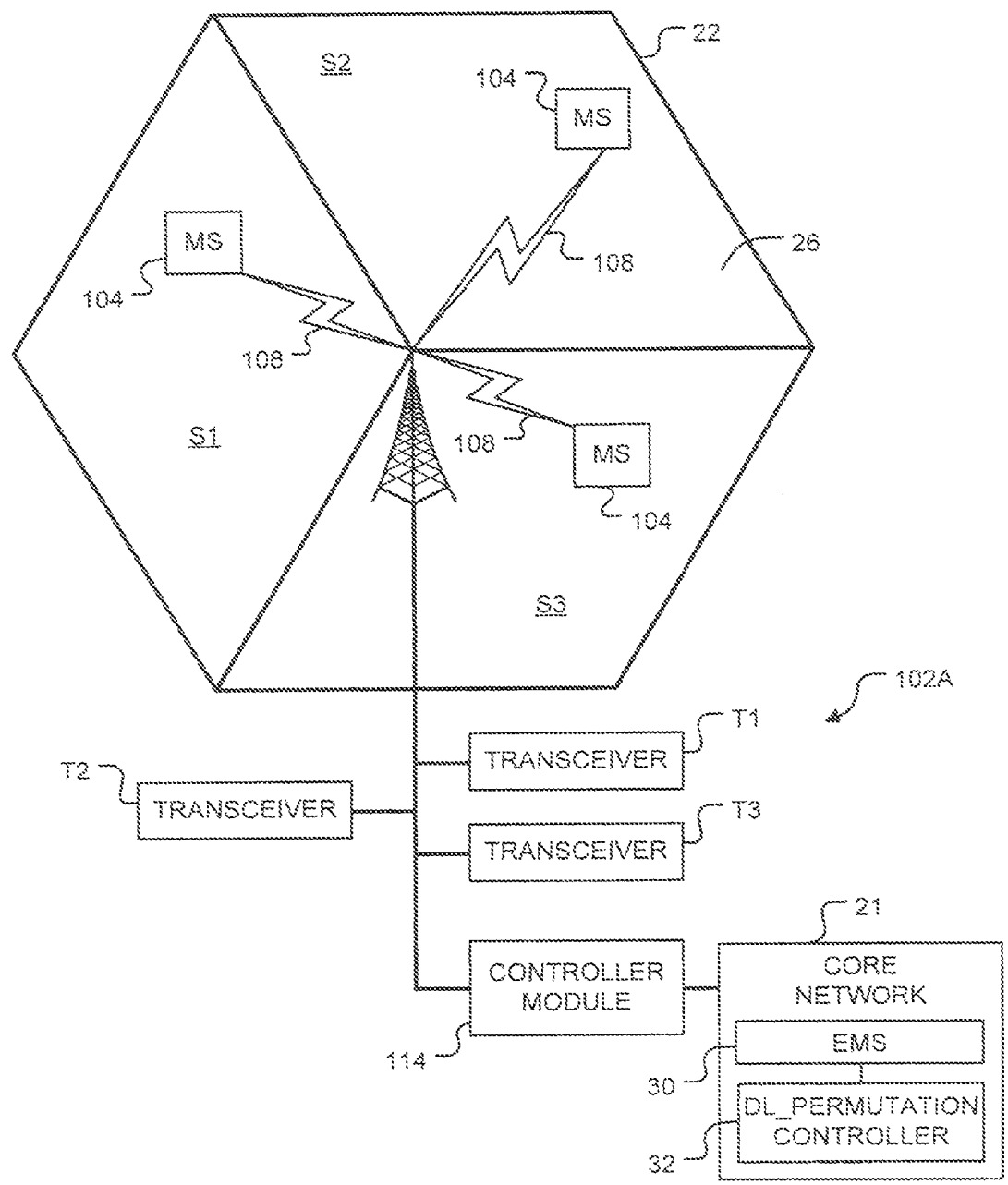
FIG. 2 is an illustration of a base station of the cellular wireless network of FIG. 1.
Figure 8:
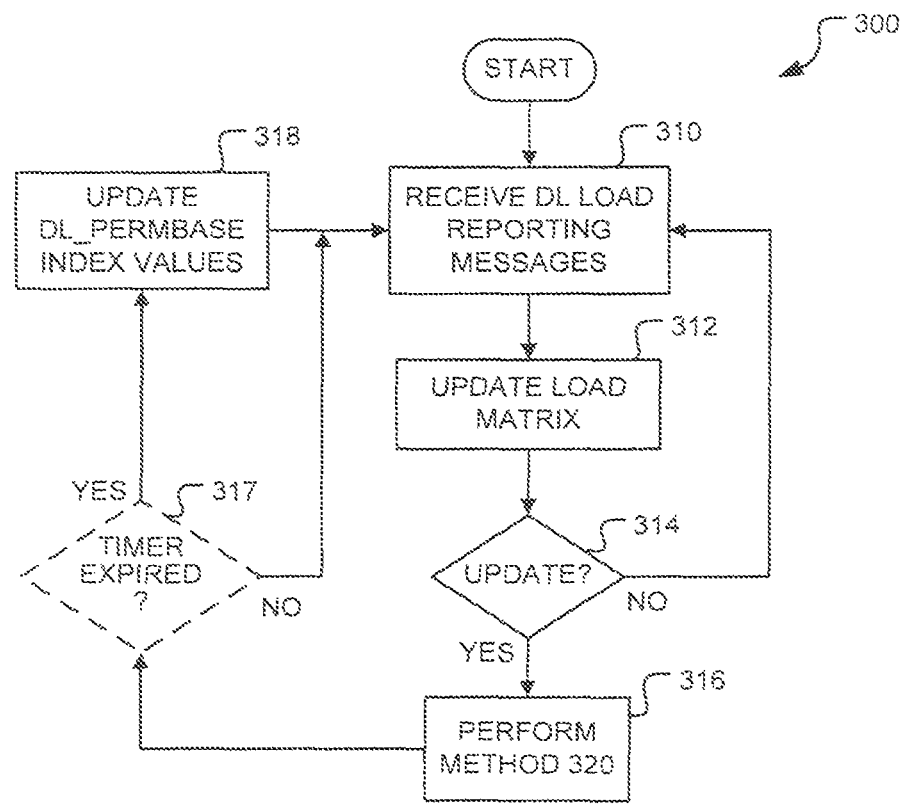

FIG. 8 is a flow diagram of a method performed by a controller module of the base station of FIG. 2.

Figure 1:
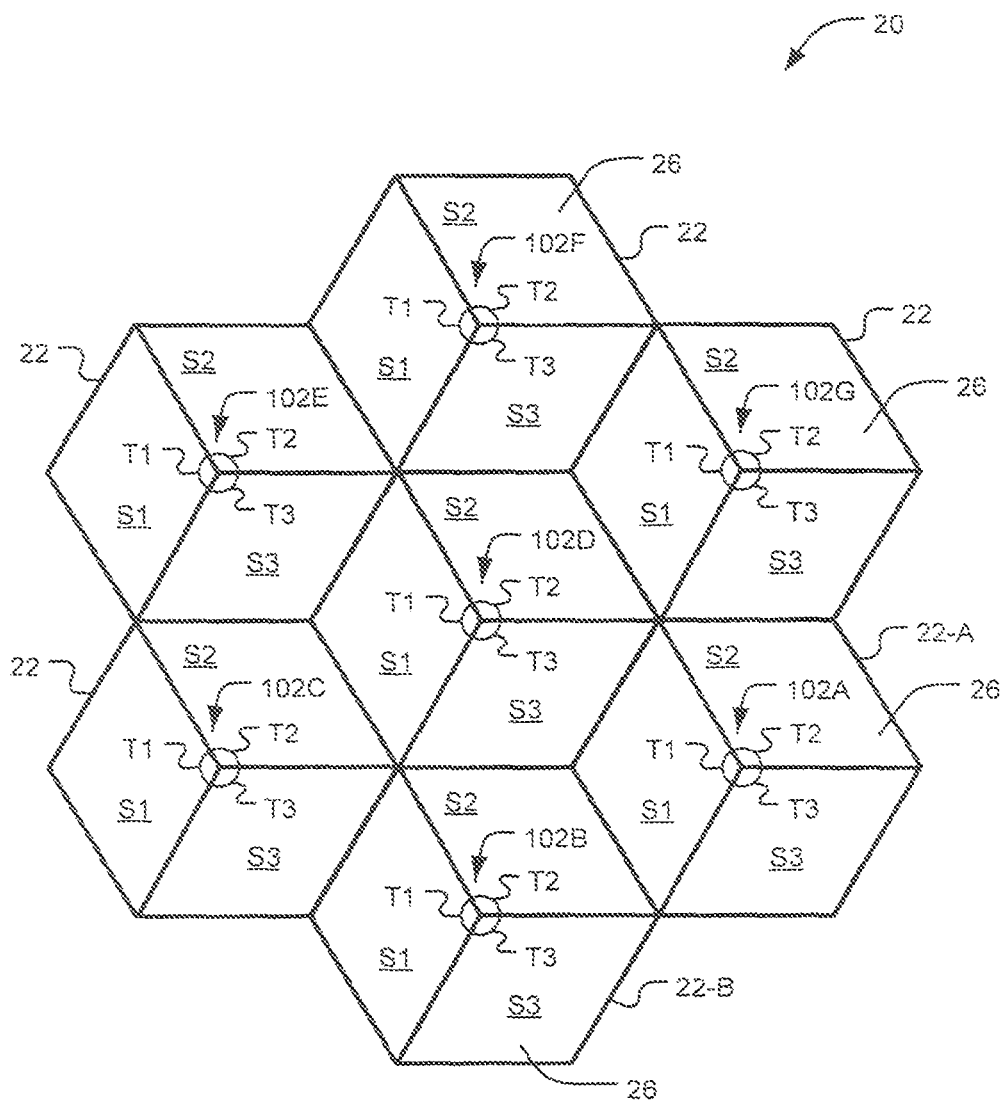
FIG. 1 is an illustration of a cellular wireless network.
Figure 9:
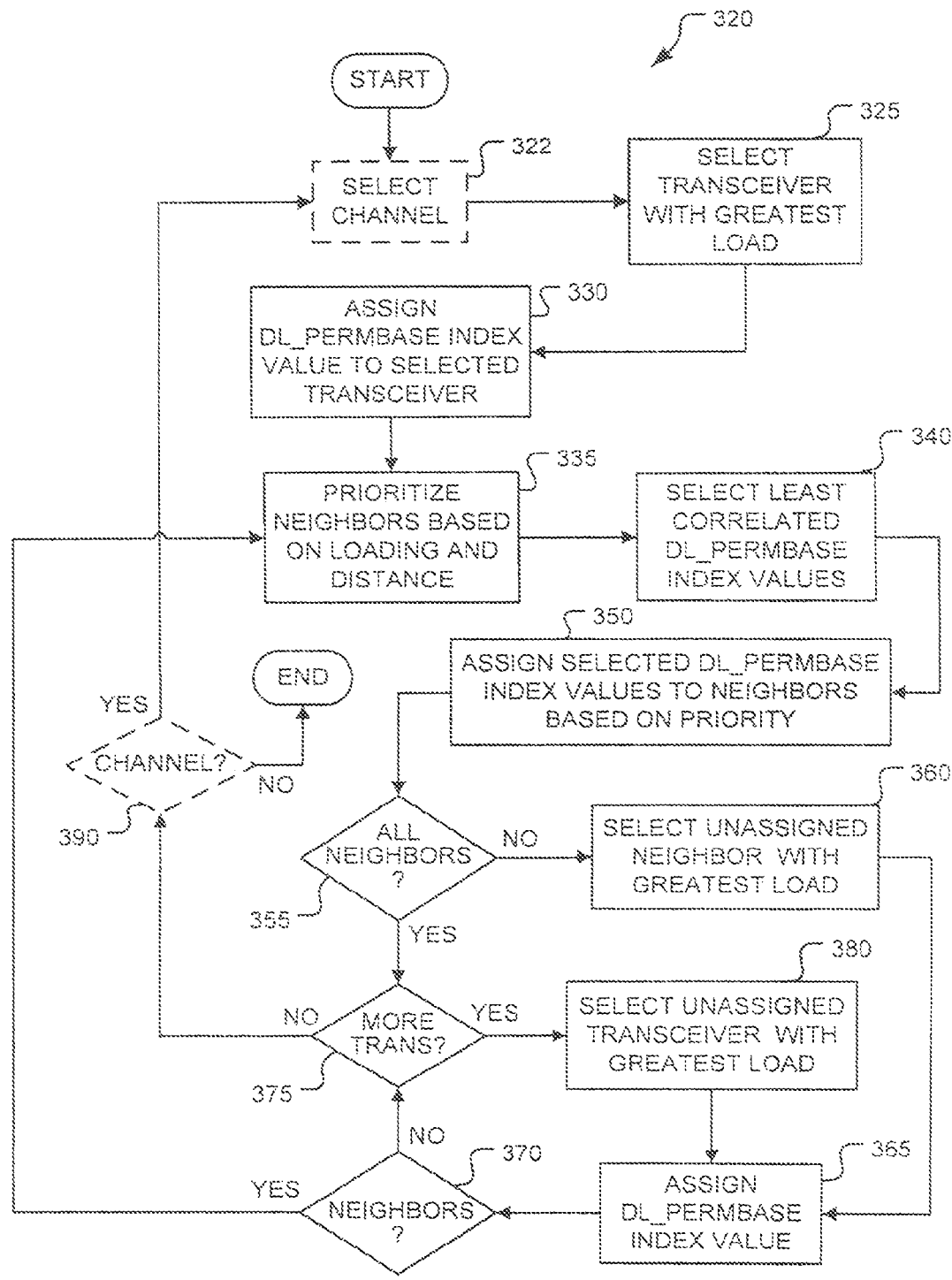

FIG. 9 is a flow diagram of a method performed by a DL_Permutation controller of the cellular wireless network of FIG. 1.

Figure 10:
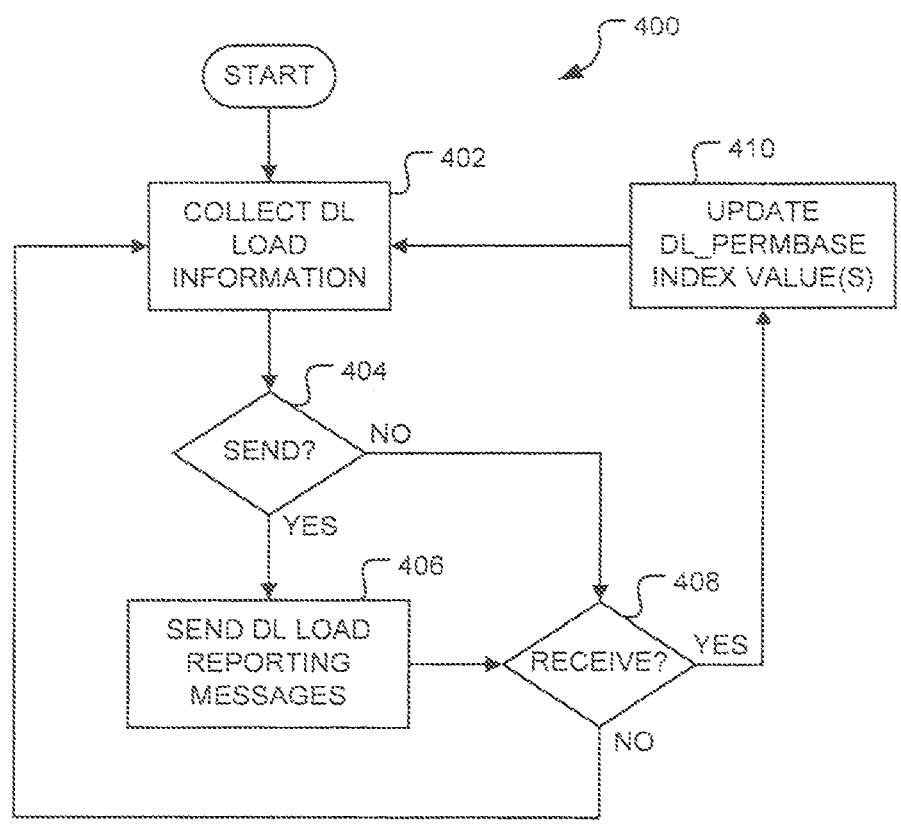

FIG. 10 is a flow diagram of a method performed by the DL_Permutation controller of the cellular wireless network of FIG. 1.

Figure 11:
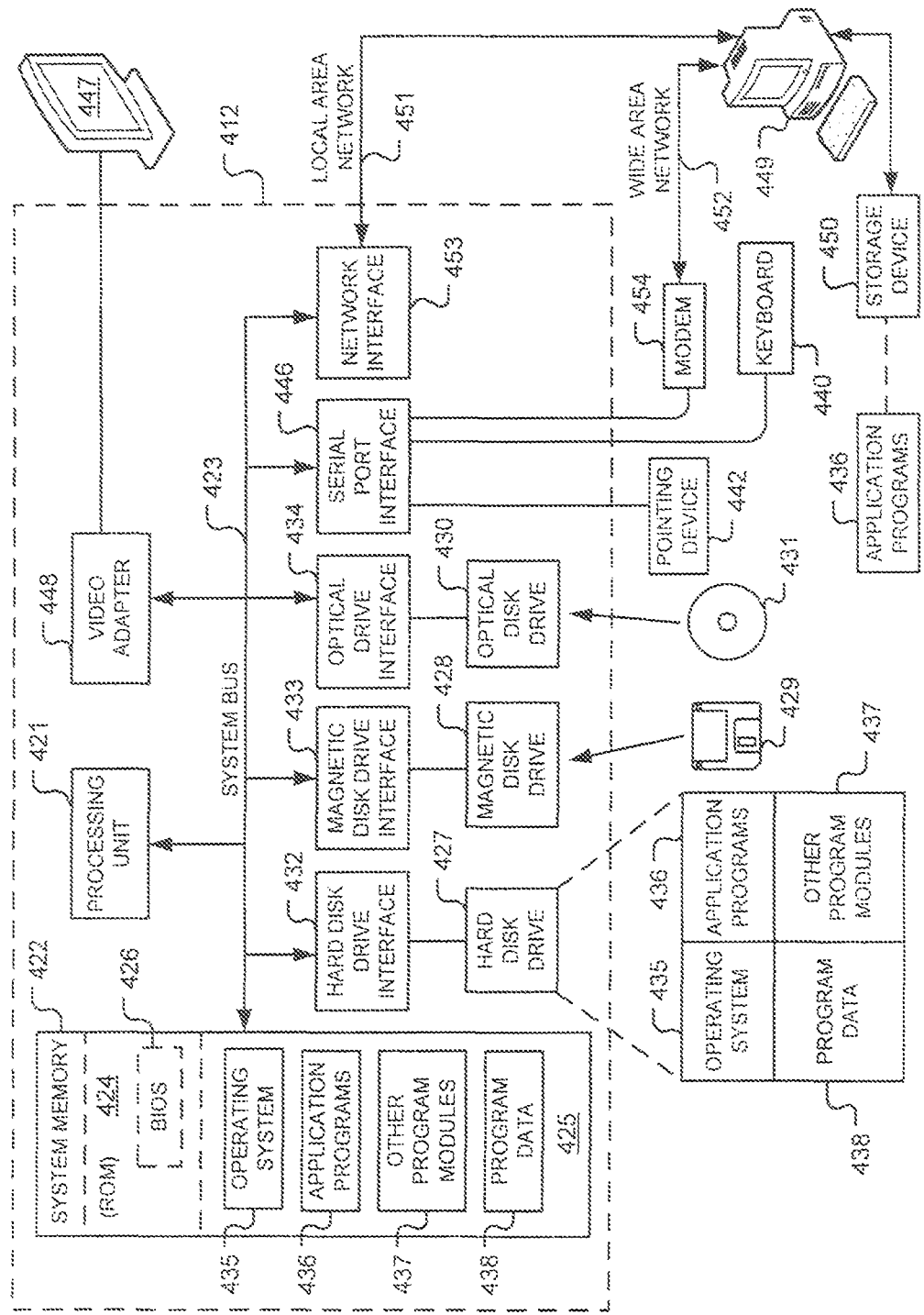

FIG. 11 is a diagram of a hardware environment and an operating environment in which the controller module and DL_Permutation controller may be implemented.

DETAILED DESCRIPTION OF THE INVENTION

The following list of abbreviations may be useful in understanding the technology discussed herein:

| | |
|---|---|
| BIOS | Basic Input/Output System |
| BS | Base Station |
| CPE | Consumer Premise Equipment |
| CPU | Central Processing Unit |
| DL | Downlink |
| EMS | Element Management System |
| FUSC | Full Usage of Sub-Channels |
| IEEE | Institute of Electrical and Electronics Engineers |
| ITU | International Telecommunication Union |
| LAN | Local-Area Network |
| LN | Logical Numbers |
| MS | Mobile Station |
| OFDM | Orthogonal Frequency-Division Multiplexing |
| OFDMA | Orthogonal Frequency-Division Multiple Access |
| OSI Model | Open Systems Interconnection Reference Model |
| PUSC | Partial Usage of Sub-Channels |
| RAM | Random Access Memory |
| RF | Radio Frequency |
| ROM | Read Only Memory |
| SS | Subscriber Stations |
| STC | Space-Time Coding |
| UL | Uplink |
| USB | Universal Serial Bus |
| WAN | WIDE-Area Network |
| WiMAX | Worldwide Interoperability for Microwave Access |

The present application describes a method of assigning parameter values to transceivers in a wireless communication network. Each of the parameter values assigned determines at least in part how a plurality of carriers is organized into a plurality of sub-channels that are used to communicate with mobile stations. In particular embodiments, the method assigns the parameter values to the transceivers based on correlations between the sub-channels determined by the parameter values, distances between the transceivers, and downlink loads experienced by the transceivers. After parameter values are assigned to each of the transceivers, each of the transceivers is configured to transmit on the sub-channels determined at least in part by the parameter value assigned to the transceiver.

FIG. 1 illustrates a cellular wireless network 20. The wireless network 20 may be used to implement one or more communication protocols, including, by way of example, Worldwide Interoperability for Microwave Access ("WiMAX"). For illustrative purposes, the present invention is described with respect to an exemplary WiMAX implementation. However, those of ordinary skill in the art appreciate that the present teachings may be applied to other wireless communication protocols in which a permutation base, or similar parameter is used to determine which subcarriers are assigned to which sub-channels.

The wireless network 20 includes a plurality of cells 22 each having a BS (e.g., BS 102A-102G) with a substantially hexagonal range of coverage or service area 26 divided into sectors (e.g., sectors "S1," "S2," and "S3"). By way of a non-limiting example, the wireless network 20 may implement a conventional WiMAX 1/3/3 channel reuse scheme (i.e., one base station, three sectors, three channels) or similar conventional reuse scheme. For ease of illustration, in FIG. 1, the sectors "S1" use a first frequency, the sectors "S2" use a second frequency, and the sectors "S3" use a third frequency. However, this is not a requirement.

Each of the BS 102A-102G may include a separate transceiver "T1," "T2," and "T3" for each sector "S1," "S2," and "S3," respectively. The transceiver associated with each sector is configured to transmit and receive signals using a channel assigned thereto. Generally, a different channel is assigned to each sector "S1," "S2," and "S3." Depending upon the implementation details, each sector "S1," "S2," and "S3" may include more than one transceiver. Different transceivers in the same sector may use different channels.

FIG. 2 illustrates the BS 102A of the wireless network 20. The BS 102B-102G may each be substantially similar to the BS 102A. The BS 102A-102G are connected together in the wireless network 20 by a core network 21.

As is apparent to those of ordinary skill in the art, the wireless network 20 may be conceptualized in accordance with a Telecommunications Management Network protocol model defined the Telecommunication Standardization Sector that coordinates standards for telecommunications on behalf of the International Telecommunication Union ("ITU"). The Telecommunications Management Network framework includes four logical layers: Business Management; Service Management; Network Management; and Element Management. Typically, the Element Management layer manages the functions and capabilities within each network element but does not manage the traffic between different network elements in the network. To support management of the traffic between itself and other network elements, the Element Management layer communicates with the Network Management layer. The Element Management layer is implemented in the core network 21 of the wireless network 20 as an Element Management System ("EMS") 30. The EMS 30 is connected to a DL Permutation controller 32 that will be described below.

In each of the sectors "S1," "S2," and "S3," the BS 102A is configured to transmit information to one or more mobile station ("MS") 104 and receive communications from one or more MS 104 via a plurality of communication links 108. The wireless communication links 108 each include an uplink ("UL") portion and a downlink ("DL") portion. Each of the MS 104 transmits data to the BS 102A on the UL portion and receives data from the BS 102A on the DL portion of the communication link 108.

Although referred to herein as "Mobile Stations," those skilled in the art will appreciate that a user can be in a fixed location, such as a home or office, and communicate with the BS 102A without physically changing location. The present disclosure is not limited to a MS that is actually moving. Thus, the MS may include consumer premise equipment ("CPE") and subscriber stations ("SS") operated at a fixed location.

As mentioned above, the BS 102A includes the transceivers "T1," "T2," and "T3." In an exemplary embodiment, the transceivers "T1," "T2," and "T3" are OFDM transceivers. Further, the transceiver "T1" is configured to transmit in the sector "S1" using the first channel, the transceiver "T2" is configured to transmit in the sector "S2" using the second channel, and the transceiver "T3" is configured to transmit in the sector "S3" using the third channel. Each of the transceivers "T1," "T2," and "T3" has been assigned an initial DL_PermBase index value. By way of a non-limiting example, the initial DL_PermBase index value may have been assigned manually by a technician.

The BS 102A also includes a controller module 114. The controller modules of one or more BS may be connected to a base station controller (not shown). The controller module 114 controls operation of the BS 102A. For example, the controller module 114 selects the operational frequencies of the transceivers "T1," "T2," and "T3." Further, the controller module 114 stores the DL_PermBase index values assigned to each of the transceivers "T1," "T2," and "T3," and uses the DL_PermBase index values to determine which subcarriers are assigned to which sub-channels in each DL permutation zone (e.g., the DL PUSC zone, the DL FUSC zone, and the like). These values are communicated to the MS 104 by transceivers "T1," "T2," and "T3" in the DL portion of a frame. By way of non-limiting example, the DL_PermBase index values may be include in the DL map ("DL_MAP") portions of frames transmitted by transceivers "T1," "T2," and "T3." Operational details of the BS 102A are known in the art and need not be described in greater detail herein.

Returning to FIG. 1, as is appreciated by those of ordinary skill in the art, signals transmitted by the transceiver "T3" of the cell 22-A may interfere with signals transmitted by the transceiver "T3" of the cell 22-B because the two sectors are using the same channel. This may occur even though different DL_PermBase index values were assigned to the transceiver "T3" of the cell 22-A and the transceiver "T3" of the cell 22-B because at least some correlation may exist between the subcarrier assignments as determined by the different DL_PermBase index values.

FIGS. 3-6 provide a matrix of cross correlation values calculated for the subcarriers assigned by each of the DL_PermBase index values for the same channel. The matrix lists cross correlation values for each possible pairing of DL_PermBase index values. Between the different pairs of DL_PermBase index values, the cross correlation is not always "0" and most pairs of DL_PermBase index values have non-zero correlations. Further, some pairs of DL_PermBase index values have 10% or more cross correlation interference when the same sub-channels are used.

Cross correlation is a standard method of estimating the degree to which two series are correlated. Thus, cross correlation may be used as a measure of similarity between two waveforms as a function of a time-lag applied to one of them.

In an autocorrelation, which is a cross correlation of a signal with itself, there is always a peak at a lag of zero. Energy received from the serving transceiver is largest when a received signal is maximally cross correlated with the DL_PermBase index value of the serving transceiver. Thus, cross correlation can be used to identify a signal by comparing the signal with a library of known reference signals (based on the DL_PermBase index values). Using this technique, a signal transmitted by the serving transceiver can be identified within noise and interference generated by other transceivers by cross correlating the received signal with the reference signal generated based on the DL_PermBase index value assigned to the serving transceiver. In other words, the received signal may be cross correlated with a known reference signal (generated based on the DL_PermBase index value assigned to the serving transceiver). The resulting cross correlation value will be high when the DL_PermBase index value used to generate the reference signal is the same as or similar to the DL_PermBase index value of the received signal. A sufficiently large enough cross correlation value provides an acceptable degree of confidence that the received signal was transmitted by the serving transceiver. This large cross correlation value is then used to identify other signals received from the serving transceiver. Unwanted signals and noise may be ignored or eliminated based on an amount of cross correlation between those signals and the reference signal, which is less than the large cross correlation value observed between reference signal and signals transmitted by the serving transceiver. The amount of interference received from another (neighboring) transceiver depends on an amount of cross correlation between the DL_PermBase index value of the serving transceiver and the DL_PermBase index value of the neighboring transceiver.

In the matrix provided in FIGS. 3-6, each column corresponds to one of the DL_PermBase index values 0-31 and each row corresponds to one of the DL_PermBase index values 0-31. Thus, the value in the column labeled "5" and the row labeled "23" is the cross correlation between the subcarriers of the DL_PermBase index value 5 and the subcarriers of the DL_PermBase index value 23 (which is about 0.09836). The matrix is symmetrical about its diagonal such that the cross correlation value for column labeled "5," and the row labeled "23" is identical to the cross correlation value in the row labeled "5" and the column labeled "23." Further, as explained above, the cross correlation is 100% when two transceivers are using the same channel and assigned the same DL_PermBase index values because the transceivers are both transmitting using the exact same subcarriers/sub-channel assignments. Thus, if the transceiver "T3" of the cell 22-A is assigned the DL_PermBase index value of "0" and the transceiver "T3" of the cell 22-B is also assigned the DL_PermBase index value of "0," the signals transmitted by the transceiver "T3" of the cell 22-A and received by the transceiver "T3" of the cell 22-B would be interfering 100% with the signals transmitted by the MS 104 (see FIG. 2) and received by the transceiver "T3" of the cell 22-B. Similarly, the signals transmitted by the transceiver "T3" of the cell 22-B and received by the transceiver "T3" of the cell 22-A would be interfering 100% with the signals transmitted by the MS 104 (see FIG. 2) and received by the transceiver "T3" of the cell 22-A.

As can be seen in FIGS. 3-6, when different DL_PermBase index values are assigned to nearby transceivers using the same channel (e.g., the transceivers "T3" of the cells 22-A and 22-B), the cross correlation is less than 100%. However, the cross correlation is greater than zero for all pairings.

FIG. 7 provides an illustration of an exemplary frame 280. Those of ordinary skill in the art appreciate that the frame 280 is provided merely for illustrative purposes and many alternate frame configurations are known in the art. The invention is not limited by the configuration of the frames used or how data is allocated within the frame.

As explained above, the time/frequency grid of the frame 280 is divided into permutation zones (i.e., groupings of contiguous symbols that use the same sub-channelization scheme). In the implementation illustrated in FIG. 7, the frame 280 includes an UL PUSC Zone 282 and a DL PUSC Zone 284. While not illustrated, the frame 280 may also include other permutation zones used for UL and/or DL. For example, the frame 280 may include a DL FUSC zone (not shown). A static division of the frame 280 into UL and DL portions may be used. Alternatively, a dynamic division of the frame 280 into UL and DL portions may be used.

As explained in the Background Section, subcarriers are assigned to sub-channels in the DL PUSC Zone of the frame 280 based at least in part on the DL_PermBase index value assigned to the transceiver (e.g., the transceivers "T1," "T2," and "T3" illustrated in FIG. 1) with which the MS 104 (see FIG. 2) is communicating. As also explained above, conventionally, DL_PermBase index values have been manually assigned to transceivers in a wireless network by technicians. Technicians generally employ a best guess approach when selecting a DL_PermBase index value to assign. The only general rule applied is that the technician should not assign the same DL_PermBase index values to adjacent transceivers. Referring to FIG. 1, this may include adjacent transceivers used by the same BS (e.g., one of the BS 102A-102G) or transceivers used by nearby or adjacent BS 102A-102G.

In a conventional wireless network, after the DL_PermBase index values are assigned, they remain static and do not change in response to changing load conditions in the wireless network. In particular, DL loading of nearby sectors having the same frequency assignment is not considered when assigning the DL_PermBase index values or later during operation. In particular, the DL loading of nearby sectors having the same frequency assignment is not used to modify the DL_PermBase index value assignments. Further, no consideration has been given to the cross correlations (provided in the matrix of FIGS. 3-6) between the subcarrier/sub-channel assignments determined at least in part by the DL_PermBase index values. In other words, little to no effort has been made to optimize or improve the assignment of DL_PermBase index values within a wireless network.

In contrast, the wireless network 20 is configured to assign DL_PermBase index values to the transceivers "T1," "T2," and "T3" in the wireless network based at least in part on the DL load of the transceivers and/or the cross correlations (see FIGS. 3-6) between the subcarrier/sub-channel assignments determined by the DL_PermBase index values.

Turning again to FIG. 2, as explained above, the controller module 114 stores the DL_PermBase index values assigned to each of the transceivers "T1," "T2," and "T3" and uses the DL_PermBase index values to determine which subcarriers are assigned to which sub-channels in each DL permutation zone (e.g., the DL PUSC zone, the DL FUSC zone, and the like). The DL_Permutation controller 32 connected to the EMS 30 is configured to assign a DL_PermBase index value to each transceiver in the wireless network 20. The DL_Permutation controller 32 is also configured to communicate these assignments to the controller module 114. After receiving the new DL_PermBase index value assignments for the transceivers "T1," "T2," and "T3," the controller module 114 uses the new assignments to determine which subcarriers are assigned to which sub-channels in each DL permutation zone (e.g., the DL PUSC zone, the DL FUSC zone, and the like).

To assist the DL_Permutation controller 32 in assigning DL_PermBase index values to each of the transceivers "T1," "T2," and "T3" in the wireless network 20, the controller module 114 of the BS 102A may collect and report DL loading information to the DL_Permutation controller 32 in DL load reporting messages. As is apparent to those of ordinary skill in the art, controller modules are often configured to communicate load information to a gateway node (not shown), such as an ASM gateway node. Further, controller modules are typically configured to maintain a list of neighboring base stations, sectors, and/or transceivers. This information may be incorporated in the DL load reporting messages transmitted by the controller module 114 of the BS 102A. The DL loading information may be reported occasionally to the DL_Permutation controller 32. By way of a non-limiting example, the BS 102A may periodically determine a load index value based on its current DL load, and report that index value to the DL_Permutation controller 32 in the DL loading information.

The DL loading information includes an indication of how much data is being transmitted on the DL by one or more of the transceivers "T1," "T2," and "T3" of the BS 102A. The DL load reporting message may also include other information. For example, the DL load reporting message may include a list of neighbors. The neighbors in the list may include base stations, sectors, transceivers, and the like with which the BS 102A could interfere or from which the BS 102A could receive interference. Conventional methods may be used by the controller module 114 to identify such neighbors. For example, geographic proximity, radio frequency proximity (e.g., determined based on interference or signal strength), and the like may be used by the controller module 114 to identify neighbors. By way of another example, the DL load reporting message may identify the channel(s) used by the BS that sent the DL load reporting message. The DL load reporting message may also include the DL_PermBase index values currently being used by the BS 102A. A separate DL load reporting message may be sent for each transceiver or sector of the BS 102A. For example, for a single sector, the DL load reporting message may include DL loading information, a list of neighbors, the DL_PermBase index value used by the sector, and the channel(s) used by the sector. Similarly, for a single transceiver, the DL load reporting message may include DL loading information, a list of neighbors, the DL_PermBase index value used by the transceiver, and the channel used by the transceiver.

FIG. 8 provides a method 300 that may be performed by the DL_Permutation controller 32 to assign DL_PermBase index values within the wireless network 20. Before the method 300 is performed, an initial DL_PermBase index value is assigned to each of the transceivers "T1," "T2," and "T3" of each of the BS 102A-102G of the wireless network 20. By way of a non-limiting example, the initial DL_PermBase index values may be assigned manually to each of the transceivers "T1," "T2," and "T3" by a technician.

As mentioned above, in the wireless network 20, each of the BS 102A-102G collect and report DL loading information to the DL_Permutation controller 32 in DL load reporting messages. In particular embodiments, the DL loading information may be collected and reported by the controller module 114.

In first block 310, the DL_Permutation controller 32 receives DL load reporting messages from at least a portion of the BS 102A-102G in the wireless network 20.

In next block 312, the DL_Permutation controller 32 uses the information in the DL load reporting messages to generate or update a loading matrix. The loading matrix lists the current load for each transceiver using the same channel in the wireless network 20. Thus, the DL_Permutation controller 32 may have a matrix for each channel or a single multidimensional matrix in which channel is one dimension.

Then, in decision block 314, the DL_Permutation controller 32 determines whether to continue collecting DL loading information or update DL_PermBase index value assignments to the transceivers "T1," "T2," and "T3" of the BS 102A-102G. The decision in decision block 314 is "NO" when the DL_Permutation controller 32 decides to continue collecting DL loading information. The decision in decision block 314 is "YES" when the DL_Permutation controller 32 decides to update DL_PermBase index value assignments.

The decision in decision block 314 may be "YES" based on whether the DL_PermBase index value assignments are updated based on real-time load information or historical load information. If real-time load information is used, the decision in decision block 314 is always "YES." On the other hand, if historical load information is used, the decision in decision block 314 may be "YES" when the load experienced by one or more of the transceivers has changed by more than a threshold amount. By way of another non-limiting example, a timer (not shown) may be used to determine when the decision in decision block 314 is "YES." The timer may be configured to update DL_PermBase index values assigned to the transceivers "T1," "T2," and "T3" of the BS 102A-102G once a day, once a week, or the like. Using historical load information allows the DL_Permutation controller 32 to collect DL loading information between updates.

When the decision in decision block 314 is "NO," the DL_Permutation controller 32 returns to block 310.

When the decision in decision block 314 is "YES," in block 316, the DL_Permutation controller 32 performs a method 320 illustrated in FIG. 9. After completing the method 320, the DL_Permutation controller 32 advances to decision block 317.

In decision block 317, the DL_Permutation controller 32 determines whether to communicate the newly updated DL_PermBase index value assignments to each of the controller module 114 of the BS 102A-102G.

By way of a non-limiting example, a timer may be used in decision block 317 to determine whether to communicate the newly updated DL_PermBase index value assignments to each of the controller module 114 of the BS 102A-102G. Thus, the new assignments may be communicated at regular or semi-regular intervals. However, this is not a requirement. Alternatively, the new assignments may be communicated immediately after their completion, at irregular intervals, and the like.

The decision in decision block 317 is "YES" when the DL_Permutation controller 32 decides to communicate the newly updated DL_PermBase index value assignments to each of the controller module 114 of the BS 102A-102G. Otherwise, the decision in decision block 317 is "NO" when the DL_Permutation controller 32 decides not to communicate the new update DL_PermBase index value assignments to each of the controller module 114 of the BS 102A-102G.

When the decision in decision block 317 is "YES," the DL_Permutation controller 32 advances to block 318. Otherwise, when the decision in decision block 317 is "NO," the DL_Permutation controller 32 returns to block 310. In block 318, the DL_Permutation controller 32 communicates the newly updated the DL_PermBase index value assignments to the BS 102A-102G. Then, the DL_Permutation controller 32 returns to block 310.

After receiving the new DL_PermBase index value assignments for the transceivers "T1," "T2," and "T3," the BS 102A-102G use the new assignments to determine which subcarriers are assigned to which sub-channels in each DL permutation zone (e.g., the DL PUSC zone, the DL FUSC zone, and the like). Further, the BS 102A-102G may communicate this new DL_PermBase index value to one or more of the MS 104 in the DL_MAP portion of the frame 280.

Turning now to FIG. 9, in the method 320, if the wireless network 20 is using multiple channels, in optional block 322, the DL_Permutation controller 32 selects a channel. In such embodiments, blocks 325 to 380 are performed with respect to the selected channel. If the wireless network 20 is not using multiple channels, the optional block 322 is skipped.

Then, in block 325, a transceiver with the greatest load in the load matrix is selected. In block 330, a DL_PermBase index value is assigned to the transceiver selected in block 325. The DL_PermBase index value may be a preselected DL_PermBase index value. By way of a non-limiting example, the preselected DL_PermBase index value may be "0."

In block 335, the DL_Permutation controller 32 prioritizes the neighbors of the transceiver selected in block 325. These neighbors may have been identified by the selected transceiver in one or more DL load reporting messages sent to the EMS 30 and forwarded thereby to the DL_Permutation controller 32. In block 335, the neighbors of the selected transceiver are prioritized based on load and distance from the selected transceiver. In block 335, neighbors having the greatest loads that are the closest to the selected transceiver are given higher priority values than neighbors with smaller loads that are the farther from the selected transceiver.

By way of a non-limiting example, in block 335, the following formula may be used to determine the priority of a neighbor of the transceiver selected in block 325:

$$\text{Priority}=(X^*\text{Distance})+(Y^*\text{Loading})$$

In the formula above, the variables "X" and "Y" are weights that may be selected by the network operator. The variable "Distance" is the distance between neighbor and the transceiver selected in block 325. The distance may be measured using actual physical distance (e.g., miles, kilometers, and the like) or based on radio frequency ("RF"). The variable "Loading" is a measure of the DL load of the neighbor as communicated by the neighbor to the DL_Permutation controller 32 in DL load reporting messages. Either the variable "X" or the variable "Y" may be set to zero. If the variable "X" is set to zero, the priority of a neighbor of the transceiver will be based only on the measure of the DL load of the neighbor. If the variable "Y" is set to zero, the priority of a neighbor of the transceiver will be based only on the distance between neighbor and the transceiver selected in block 325.

In block 340, the DL_Permutation controller 32 selects DL_PermBase index values based on their cross correlation with the DL_PermBase index value assigned previously to the selected transceiver. For example, if the DL_PermBase index value assigned to the selected transceiver is "0," then in block 340, the DL_Permutation controller 32 selects one or more DL_PermBase index values based on their cross correlation with DL_PermBase index value "0." As explained above, these cross correlation values may be stored in a correlation matrix (e.g., the matrix illustrated in FIGS. 3-6).

In block 340, the DL_PermBase index values may be selected using a threshold value. For example, if the DL_PermBase index value assigned to the selected transceiver was "0," in block 340, the DL_Permutation controller 32 may select DL_PermBase index value having cross correlation values with the DL_PermBase index value "0" that are less than the threshold amount. By way of a non-limiting example, the threshold value may be within a range of about 10% to about 15%. If no DL_PermBase index values have cross correlation values below the threshold amount, the threshold amount may be increased. By way of a non-limiting example, the threshold value may be increased by about 0.2%. The threshold value may be increased until one or more DL_PermBase index values have cross correlation values below the threshold amount.

Then, in block 350, the selected DL_PermBase index values are assigned to the neighbors of the selected transceiver based on the priority assigned to the neighbors in block 335. For example, in block 350, the DL_PermBase index values having the smallest cross correlation values (with respect to the DL_PermBase index value assigned to the selected transceiver) may be assigned to the neighbors having the highest priority values.

In decision block 355, the DL_Permutation controller 32 determines whether DL_PermBase index values have been assigned to all of the neighbors of the selected transceiver. The decision in decision block 355 is "YES" when DL_PermBase index values have been assigned to all of the neighbors of the selected transceiver. Otherwise, the decision in decision block 355 is "NO" when DL_PermBase index values have not been assigned to all of the neighbors of the selected transceiver.

When the decision in decision block 355 is "NO," in block 360, the DL_Permutation controller 32 selects a neighbor to which a DL_PermBase index value has not been assigned having the greatest load. This neighbor is now the selected transceiver. For example, in block 360, the DL_Permutation controller 32 may select a transceiver to which a DL_PermBase index value has not been assigned having the greatest load in the load matrix as the selected transceiver. By way of another example, in block 360, the DL_Permutation controller 32 may selects a neighbor to which a DL_PermBase index value has not been assigned having the highest priority.

Then, in block 365, a DL_PermBase index value is be assigned to the transceiver selected in block 360. The DL_PermBase index value may be a preselected next DL_PermBase index value. Then, the DL_Permutation controller 32 advances to decision block 370.

In decision block 370, the DL_Permutation controller 32 determines whether the transceiver selected in block 360 has neighbors to which DL_PermBase index values have not been assigned. The decision in decision block 370 is "YES" when the selected transceiver has neighbors to which DL_PermBase index values have not been assigned. Otherwise, the decision in decision block 370 is "NO" when DL_PermBase index values have been assigned to all of the neighbors of the selected transceiver.

When the decision in decision block 370 is "YES," the DL_Permutation controller 32 returns to block 335.

When the decision in decision block 370 is "NO," the DL_Permutation controller 32 advances to decision block 375.

When the decision in decision block 355 is "NO," the DL_Permutation controller 32 advances to decision block 375.

In decision block 375, the DL_Permutation controller 32 determines whether the wireless network 20 includes any transceivers to which DL_PermBase index values have not been assigned. The decision in decision block 375 is "YES" when the wireless network 20 includes transceivers to which DL_PermBase index values have not been assigned. Otherwise, the decision in decision block 375 is "NO" when DL_PermBase index values have been assigned to all of the transceivers in the wireless network 20.

When the decision in decision block 375 is "YES," in block 380, the DL_Permutation controller 32 selects a transceiver having the greatest load to which a DL_PermBase index value has not been assigned. Alternatively, in block 380, the DL_Permutation controller 32 selects a transceiver having the greatest priority value to which DL_PermBase index values have not been assigned. Then, the DL_Permutation controller 32 returns to block 365.

When the decision in decision block 375 is "NO," DL_PermBase index values have been assigned to all of the transceivers in the wireless network 20. When the decision in decision block 375 is "NO," if the wireless network 20 is using more than one channel, the DL_Permutation controller 32 advances to optional decision block 390. On the other hand, if the wireless network 20 is not using more than one channel, the decision block 390 is omitted and the method 320 terminates.

In optional decision block 390, the DL_Permutation controller 32 determines whether the wireless network 20 is using a channel that has not been selected. The decision in optional decision block 390 is "YES" when the wireless network 20 is using a channel that has not been selected. Otherwise, the decision in optional decision block 390 is "NO" when the wireless network 20 is not using a channel that has not been selected.

When the decision in optional decision block 390 is "YES," DL_Permutation controller 32 returns to optional block 322 whereat a different channel is selected. When the decision in optional decision block 390 is "NO," the method 320 terminates.

By performing the method 300, the DL_Permutation controller 32 determines and updates the DL_PermBase index values for at least a portion of the BS 102A-102G in the wireless network 20 based on the historical load information stored in the loading matrix and cross correlations (optionally stored in a correlation matrix) between the subcarriers assigned by the DL_PermBase index values to sub-channels.

The method 300 may be used to reduce or minimize interference of the DL portion of the frame 280 (e.g., within the DL PUSC zone) by considering both loading and cross correlations between subcarriers when assigning the subcarriers to sub-channels for at least a portion of the BS 102A-102G in the wireless network 20. This may result in improved signal quality and/or increased data throughput.

The method 300 may be performed using historical data and/or real-time data. For example, the load matrix may store load values for the transceivers over a predetermined duration (e.g., daily loading, weekly loading, monthly loading, and the like). By way of another non-limiting example, the load matrix may be updated in real-time as DL load reporting messages are received from one or more of the BS 102A-102G. In such embodiment, the DL_Permutation controller 32 may determine the DL_PermBase index value assignments for all BS 102A-102G to be used every pre-defined period (which may be user definable). For example, the DL_Permutation controller 32 may determine the DL_PermBase index value assignments every 100 frames.

FIG. 10 provides a method 400 that may be performed by the controller module 114 (see FIG. 2) to assign DL_PermBase index values to the transceivers "T1," "T2," and "T3"

(see FIG. 2). Before the method 400 is performed, initial DL_PermBase index values are assigned to the transceivers "T1," "T2," and "T3."

In first block 402, the controller module 114 collects DL loading information for the transceivers "T1," "T2," and "T3."

In decision block 404, the controller module 114 decides whether to send the DL loading information to the DL_Permutation controller 32. The decision in decision block 404 is "YES," when the controller module 114 decides to send the DL loading information to the DL_Permutation controller 32. By way of a non-limiting example, the controller module 114 may decide to send the DL loading information to the DL_Permutation controller 32 periodically. In such embodiments, a timer (not shown) may be used to determine when to send the DL loading information to the DL_Permutation controller 32. Alternatively, the controller module 114 may decide to send the DL loading information to the DL_Permutation controller 32 whenever DL loading over a predetermined period changes by more than a threshold amount. On the other hand, the decision in decision block 404 is "NO," when the controller module 114 decides not to send the DL loading information to the DL_Permutation controller 32.

When the decision in decision block 404 is "YES," in block 406, the controller module 114 sends the DL loading information to the DL_Permutation controller 32 in one or more DL load reporting messages. Then, the controller module 114 advances to decision block 408.

When the decision in decision block 404 is "NO," the controller module 114 advances to decision block 408. In decision block 408, the controller module 114 determines whether it has received an updated DL_PermBase index value for one or more of the transceivers "T1," "T2," and "T3." The decision in decision block 408 is "YES," when the controller module 114 has received an updated DL_PermBase index value for one or more of the transceivers "T1," "T2," and "T3." The decision in decision block 408 is "NO," when the controller module 114 has not received an updated DL_PermBase index value for any of the transceivers "T1," "T2," and "T3."

When the decision in decision block 408 is "YES," in block 410, the controller module 114 updates the DL_PermBase index value(s) for the appropriate ones of transceivers "T1," "T2," and "T3." Then, the controller module 114 returns to block 402 to collect DL loading information for the transceivers "T1," "T2," and "T3."

When the decision in decision block 408 is "NO," the controller module 114 returns to block 402 to collect DL loading information for the transceivers "T1," "T2," and "T3."

FIG. 11 is a diagram of hardware and an operating environment in conjunction with which implementations of the controller module 114 and/or the DL_Permutation controller 32 may be practiced. The description of FIG. 11 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that implementations may be practiced with other computer system configurations, including multiprocessor systems, mainframe computers, and the like. Implementations may also be practiced in distributed computing environments where tasks are performed by remote processing devices that are linked through a communications network. In a distributed computing environment, program modules may be located in both local and remote memory storage devices.

The exemplary hardware and operating environment of FIG. 11 includes a general-purpose computing device in the form of a computing device 412. Each of the controller module 114 and the DL_Permutation controller 32 may be implemented in accordance with the computing device 412. By way of non-limiting example, the method 300 (see FIG. 8) and the method 320 (see FIG. 9) may be implemented on a first computing device like the computing device 412. The method 400 (see FIG. 10) may be implemented on a second computing device like the computing device 412.

The computing device 412 includes the system memory 422. The computing device 412 also includes a processing unit 421, and a system bus 423 that operatively couples various system components, including the system memory 422, to the processing unit 421. There may be only one or there may be more than one processing unit 421, such that the processor of computing device 412 comprises a single central processing unit ("CPU"), or a plurality of processing units, commonly referred to as a parallel processing environment. The computing device 412 may be a conventional computer, a distributed computer, or any other type of computer.

The system bus 423 may be any of several types of bus structures including a memory bus or memory controller, a peripheral bus, and a local bus using any of a variety of bus architectures. The system memory may also be referred to as simply the memory, and includes read only memory ("ROM") 424 and random access memory ("RAM") 425. A basic input/output system ("BIOS") 426, containing the basic routines that help to transfer information between elements within the computing device 412, such as during start-up, is stored in ROM 424. The computing device 412 further includes a hard disk drive 427 for reading from and writing to a hard disk, not shown, a magnetic disk drive 428 for reading from or writing to a removable magnetic disk 429, and an optical disk drive 430 for reading from or writing to a removable optical disk 431 such as a CD ROM, DVD, or other optical media.

The hard disk drive 427, magnetic disk drive 428, and optical disk drive 430 are connected to the system bus 423 by a hard disk drive interface 432, a magnetic disk drive interface 433, and an optical disk drive interface 434, respectively. The drives and their associated computer-readable media provide nonvolatile storage of computer-readable instructions, data structures, program modules, and other data for the computing device 412. It should be appreciated by those skilled in the art that any type of computer-readable media which can store data that is accessible by a computer, such as magnetic cassettes, flash memory cards, USB drives, digital video disks, Bernoulli cartridges, RAMs, ROMs, and the like, may be used in the exemplary operating environment. As is apparent to those of ordinary skill in the art, the hard disk drive 427 and other forms of computer-readable media (e.g., the removable magnetic disk 429, the removable optical disk 431, flash memory cards, USB drives, and the like) accessible by the processing unit 421 may be considered components of the system memory 422.

A number of program modules may be stored on the hard disk drive 427, magnetic disk 429, optical disk 431, ROM 424, or RAM 425, including an operating system 435, one or more application programs 436, other program modules 437, and program data 438. A user may enter commands and information into the computing device 412 through input devices such as a keyboard 440 and pointing device 442. Other input devices (not shown) may include a microphone, joystick, game pad, satellite dish, scanner, or the like. These and other input devices are often connected to the processing unit 421 through a serial port interface 446 that is coupled to the system bus 423, but may be connected by other interfaces, such as a parallel port, game port, or a universal serial bus ("USB"). A monitor 447 or other type of display device is also connected to the system bus 423 via an interface, such as a video adapter 448. In addition to the monitor, computers typically include other peripheral output devices (not shown), such as speakers and printers.

The computing device 412 may operate in a networked environment using logical connections to one or more remote computers, such as remote computer 449. These logical connections are achieved by a communication device coupled to or a part of the computing device 412 (as the local computer). Implementations are not limited to a particular type of communications device. The remote computer 449 may be another computer, a server, a router, a network PC, a client, a memory storage device, a peer device or other common network node, and typically includes many or all of the elements described above relative to the computing device 412. The remote computer 449 may be connected to a memory storage device 450. The logical connections depicted in FIG. 11 include a local-area network ("LAN") 451 and a wide-area network ("WAN") 452. Such networking environments are commonplace in offices, enterprise-wide computer networks, intranets and the Internet.

When used in a LAN-networking environment, the computing device 412 is connected to the LAN 451 through a network interface or adapter 453, which is one type of communications device. When used in a WAN-networking environment, the computing device 412 typically includes a modem 454, a type of communications device, or any other type of communications device for establishing communications over the WAN 452, such as the Internet. The modem 454, which may be internal or external, is connected to the system bus 423 via the serial port interface 446. In a networked environment, program modules depicted relative to the personal computing device 412, or portions thereof, may be stored in the remote computer 449 and/or the remote memory storage device 450. It is appreciated that the network connections shown are exemplary and other means of and communications devices for establishing a communications link between the computers may be used.

The computing device 412 and related components have been presented herein by way of particular example and also by abstraction in order to facilitate a high-level view of the concepts disclosed. The actual technical design and implementation may vary based on particular implementation while maintaining the overall nature of the concepts disclosed.

Each of the methods 300, 320, and 400 may be implemented using software components that are executable by the processing unit 421 and when executed perform the functions described above. Such software components may be stored in a computer-readable media readable by the processing unit 421.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for use with a plurality of transceivers, a plurality of parameter values, and a plurality of subcarriers, the plurality of transceivers each having a downlink load amount, and each of the parameter values determining at least in part a different subdivision of the plurality of subcarriers into a plurality of sub-channels, the method comprising:

selecting, by at least one computing device, one of the parameter values as a first parameter value, the first parameter value determining at least in part a first subdivision of the plurality of subcarriers into a first plurality of sub-channels;

selecting, by the at least one computing device, a different one of the parameter values as a second parameter value, the second parameter value determining at least in part a second subdivision of the plurality of subcarriers into a second plurality of sub-channels, the second parameter value being selected based on an amount of correlation between the first subdivision of the plurality of subcarriers into the first plurality of sub-channels and the second subdivision of the plurality of subcarriers into the second plurality of sub-channels;

selecting, by the at least one computing device, a first transceiver of the plurality of transceivers based at least in part on its downlink load amount;

instructing, by the at least one computing device, the first transceiver to transmit on the first plurality of sub-channels;

identifying, by the at least one computing device, a second transceiver of the plurality of transceivers, the second transceiver being a neighbor of the first transceiver; and instructing, by the at least one computing device, the second transceiver to transmit on the second plurality of sub-channels.

2. The method of claim 1, further comprising before selecting the second parameter value:

for each of the parameter values, calculating, by the at least one computing device, an amount of correlation between the first subdivision of the plurality of subcarriers into the first plurality of sub-channels and a subdivision of the plurality of subcarriers into a plurality of sub-channels determined at least in part by the parameter value;

storing, by the at least one computing device, the correlation amounts in a correlation matrix; and determining, by the at least one computing device, the amount of correlation between the first subdivision of the plurality of subcarriers into the first plurality of sub-channels and the second subdivision of the plurality of subcarriers into the second plurality of sub-channels using the correlation matrix.

3. The method of claim 1, wherein identifying, by the at least one computing device, the second transceiver further comprises:

identifying one or more neighboring transceivers of the first transceiver; and selecting one of the one or more neighboring transceivers of the first transceiver as the second transceiver based at least in part on the downlink load amount of the second transceiver.

4. The method of claim 1, further comprising receiving, at the at least one computing device, a message from each of the plurality of transceivers including the downlink load amount of the transceiver.

5. The method of claim 1, wherein identifying, by the at least one computing device, the second transceiver further comprises:

Identifying, by the at least one computing device, neighboring transceivers of the first transceiver, the neighboring transceivers each being positioned a distance from the first transceiver; and selecting, by the at least one computing device, one of the neighboring transceivers based at least in part on its distance from the first transceiver.

6. A method for use with a plurality of subcarriers, the method comprising:

organizing, by at least one computing device, the plurality of subcarriers into pluralities of groups, within each plurality of groups, each of the plurality of subcarriers belonging to at least one of the groups;

selecting, by the at least one computing device, a first transceiver having a downlink load amount;

selecting, by the at least one computing device, a second transceiver having a downlink load amount, the selection of at least one of the first and second transceivers being based at least in part on the downlink load amount of the at least one of the first and second transceivers;

assigning, by the at least one computing device, a first of the pluralities of groups to the first transceiver;

determining, by the at least one computing device, an amount of correlation between the first plurality of groups and each of the pluralities of groups;

selecting, by the at least one computing device, one of the pluralities of groups based on the amount of correlation between the first plurality of groups and the selected plurality of groups; and assigning, by the at least one computing device, one come the selected plurality of groups to the second transceiver.

7. The method of claim 6, further comprising:

selecting, by the at least one computing device, the second transceiver based at least in part on its distance from the first transceiver.

8. A non-transitory computer-readable medium comprising instructions that when executed by a processor perform a method comprising:

determining an amount of load experienced by each of a plurality of transceivers;

determining whether an amount of correlation between a first permutation parameter value and a second permutation parameter value is less than a threshold amount, the first permutation parameter value being different from the second permutation parameter value, the correlation amount being an amount of correlation between a first grouping of a plurality of subcarriers into sub-channels that is associated with the first permutation parameter value and a second grouping of the same plurality of subcarriers into sub-channels that is associated with the second permutation parameter value;

selecting a first transceiver of the plurality of transceivers based on the amount of load experienced by the first transceiver;

assigning the first permutation parameter value to the first transceiver;

selecting a second transceiver of the plurality of transceivers, the second transceiver being a neighbor of the first transceiver; and assigning the second permutation parameter value to the second transceiver.

9. The non-transitory computer-readable medium of claim 8, wherein the second transceiver is selected based on an amount of downlink load experienced by the second transceiver and its distance from the first transceiver.

10. A method for use with a plurality of parameter values, a channel comprising a plurality of subcarriers, and a plurality of transceivers, each of the parameter values determining at least in part how the subcarriers are organized into a plurality of sub-channels of the channel, the method comprising:

assigning, by at least one computing device, a parameter value to each of the transceivers, thereby causing each of the transceivers to transmit on the plurality of sub-channels determined at least in part by the parameter value assigned to the transceiver, the transmitting causing the transceiver to experience a downlink load; and assigning, by the at least one computing device, different parameter values to the transceivers based on correlations between the plurality of sub-channels determined at least in part by the parameter values and the downlink loads experienced by the transceivers.

11. A method for use with a plurality of transceivers, a plurality of parameter values, and a plurality of subcarriers, the plurality of transceivers each having a downlink load amount, and each of the parameter values determining at least in part a different subdivision of the plurality of subcarriers into a plurality of sub-channels, the method comprising:

selecting, by at least one computing device, one of the parameter values as a first parameter value, the first parameter value determining at least in part a first subdivision of the plurality of subcarriers into a first plurality of sub-channels;

selecting, by the at least one computing device, a different one of the parameter values as a second parameter value, the second parameter value determining at least in part a second subdivision of the plurality of subcarriers into a second plurality of sub-channels, the second parameter value being selected based on an amount of correlation between the first subdivision of the plurality of subcarriers into the first plurality of sub-channels and the second subdivision of the plurality of subcarriers into the second plurality of sub-channels;

selecting, by the at least one computing device, a first transceiver of the plurality of transceivers based at least in part on its downlink load amount;

instructing, by the at least one computing device, the first transceiver to transmit on the first plurality of sub-channels;

receiving, at the at least one computing device, a message from the first transceiver identifying one or more neighboring transceivers;

selecting, by the at least one computing device, one of the one or more neighboring transceivers of the first transceiver as a second transceiver based at least in part on the downlink load amount of the second transceiver; and instructing, by the at least one computing device, the second transceiver to transmit on the second plurality of sub-channels.

12. A method for use with a plurality of transceivers, a plurality of parameter values, and a plurality of subcarriers, the plurality of transceivers each having a downlink load amount, and each of the parameter values determining at least in part a different subdivision of the plurality of subcarriers into a plurality of sub-channels, the method comprising:

selecting, by at least one computing device, one of the parameter values as a first parameter value, the first parameter value determining at least in part a first subdivision of the plurality of subcarriers into a first plurality of sub-channels;

selecting, by the at least one computing device, a different one of the parameter values as a second parameter value, the second parameter value determining at least in part a second subdivision of the plurality of subcarriers into a second plurality of sub-channels, the second parameter value being selected based on an amount of correlation between the first subdivision of the plurality of subcarriers into the first plurality of sub-channels and the second subdivision of the plurality of subcarriers into the second plurality of sub-channels;

selecting, by the at least one computing device, a first transceiver of the plurality of transceivers based at least in part on its downlink load amount;

instructing, by the at least one computing device, the first transceiver to transmit on the first plurality of sub-channels;

identifying, by the at least one computing device, one or more neighboring transceivers of the first transceiver;

receiving, at the at least one computing device, a message from each of the one or more neighboring transceivers including the downlink load amount of the respective one of the one or more neighboring transceivers;

selecting, by the at least one computing device, one of the one or more neighboring transceivers of the first transceiver as a second transceiver based at least in part on the downlink load amount of the second transceiver; and instructing, by the at least one computing device, the second transceiver to transmit on the second plurality of sub-channels.

13. A method for use with a plurality of transceivers, a plurality of parameter values, and a plurality of subcarriers, the plurality of transceivers each having a downlink load amount, and each of the parameter values determining at least in part a different subdivision of the plurality of subcarriers into a plurality of sub-channels, the method comprising:

selecting, by at least one computing device, one of the parameter values as a first parameter value, the first parameter value determining at least in part a first subdivision of the plurality of subcarriers into a first plurality of sub-channels;

selecting, by the at least one computing device, a different one of the parameter values as a second parameter value, the second parameter value determining at least in part a second subdivision of the plurality of subcarriers into a second plurality of sub-channels, the second parameter value being selected based on an amount of correlation between the first subdivision of the plurality of subcarriers into the first plurality of sub-channels and the second subdivision of the plurality of subcarriers into the second plurality of sub-channels;

selecting, by the at least one computing device, one of the plurality of transceivers having a greatest downlink load amount as a first transceiver;

instructing, by the at least one computing device, the first transceiver to transmit on the first plurality of sub-channels;

identifying, by the at least one computing device, a second transceiver of the plurality of transceivers, the second transceiver being a neighbor of the first transceiver; and instructing, by the at least one computing device, the second transceiver to transmit on the second plurality of sub-channels.

14. The method of claim 13, further comprising receiving, at the at least one computing device, a message from each of the plurality of transceivers including the downlink load amount of the transceiver.

* * * * *